Aug. 23, 1966  R. FINKEL  3,268,238
PUBLICATIONS
Filed June 3, 1964  2 Sheets-Sheet 1

AND THE RABBIT MUNCHED
HAPPILY AWAY AT THE
CARROT, WHILE THE FARMER

INVENTOR.
RICHARD FINKEL
BY
Robert J. Schiller
ATTORNEY

Aug. 23, 1966   R. FINKEL   3,268,238
PUBLICATIONS

Filed June 3, 1964   2 Sheets-Sheet 2

INVENTOR.
RICHARD FINKEL
BY
Robert J. Schiller
ATTORNEY

United States Patent Office 3,268,238
Patented August 23, 1966

3,268,238
PUBLICATIONS
Richard Finkel, 127 Elgin St., Newton, Mass.
Filed June 3, 1964, Ser. No. 372,330
3 Claims. (Cl. 283—63)

This invention relates to publications and more particularly to publications in which pictorial representations illustrative of the text are adapted to provide the illusion of animation.

By the term publication, it is intended to refer to a plurality of pages affixed or bound to one another along a common margin and having a text printed or otherwise impressed on the surface of one or more of the pages, such publication to include books, magazines, pamphlets and the like.

The principal object of the present invention is to provide such a publication which includes pictures accompanying appropriate portions of the text which such pictures seek to illustrate in a manner which provides the illusion of motion. To this end, the novel publication contemplated by the principles of the present invention includes a plurality of bound sheets upon at least some of which the text has been impressed. Adjoining selected portions of text are pictorial representations in the form of displays commonly known as parallax panoramagrams. Because the latter term is quite broad in scope and covers lenticular screen devices which are intended to provide stereoscopic effects, reference will be made hereinafter simply to "animation displays." The latter term is to be construed as referring to parallax panoramagrams of known type, in which the relation of the dissected portions of the illustrations and the lenticular screen are adapted to provide the illusion of movement or animation of the illustration upon a prescribed motion of the latter with respect to an observer, i.e. for the display of at least two or more different pictures through a common screen (whether or not the pictures also may appear to have depth when viewed through the screen) such that each picture appears successively into view. In the present invention, the relation of the printed text to the associated animation display is highly important. Each animation display is intended to illustrate a dynamic situation set forth in the accompanying text, and it is of importance to this invention that the dynamic situation is an action having periodicity.

Other objects of the present invention will in part be obvious and will in part appear hereinafter. The invention accordingly comprises the product possessing the features, properties and relation of components which are exemplified in the following detailed disclosure, and the scope of the application of which will be indicated in the claims.

For a fuller understanding of the nature and objects of the present invention, reference should be had to the following detailed description taken in connection with the accompanying drawings wherein.

Figure 1:
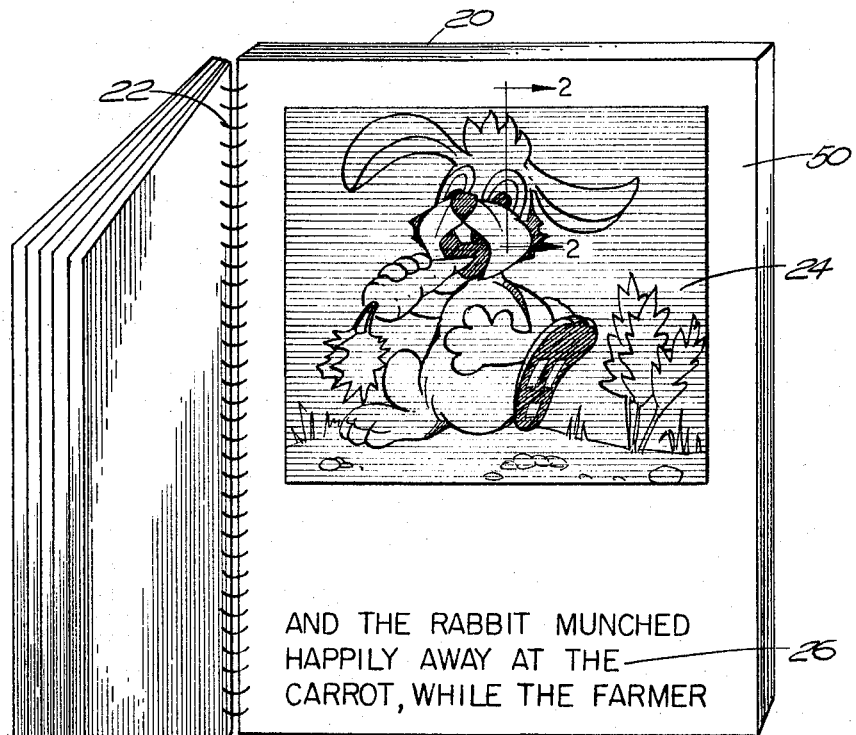
FIG. 1 is perspective view, partly in section, of a selected portion of a publication embodying the principles of the present invention.

Referring now to FIG. 1, there will be seen a publication in the form of a book comprising a plurality of sheets 20 bound together at a common margin, as by spiral wire binding 22. The book may be formed with the usual front and back covers if desired. At least one page of one of the sheets includes animation display 24 thereon. Text material 26, which display 24 is intended to illustrate, is preferably impressed on the same or an opposing page.

Display 24 can be formed as a separate element which is then attached to the appropriate page, as by pasting. Alternatively, display 24 can be formed by directly imprinting the requisite dissected pictures in interleaved manner onto the same page surface as the text to form a single composite picture, and then laminating a lenticular surface over the interleaved pictures, much as described in the formation of printed displays according to E. E. Krause, The Parallax Panoramagram, PSA Journal, May 1964, pp. 6–10.

Text material 26 includes a transitive verb form (shown in FIG. 1 as the past participle "munched") characterized in being expressive of an act or action having reversible periodicity. For example, the act of eating involves periodic up and down jaw motion; the act of juggling is composed of repetitive and reversible motions which are clearly periodic; sweeping a floor can be rhythmic or reversibly periodic; and many other homely examples can be brought easily to mind. The act need not be one which involves movement; for example, the act could be a periodic color change, such as might be exhibited by a chameleon.

On the other hand many acts are aperiodic. For instance, shooting an arrow is an act having no reversibility. Diving into water is another act which is irreversible in the sense of being aperiodic. While pictorial reversibility of a normally irreversible act (such as a diver emerging feet first from water to arise to a springboard) may be amusing, it lacks the verisimilitude which the animation display of the present invention is intended to convey.

Figure 3:
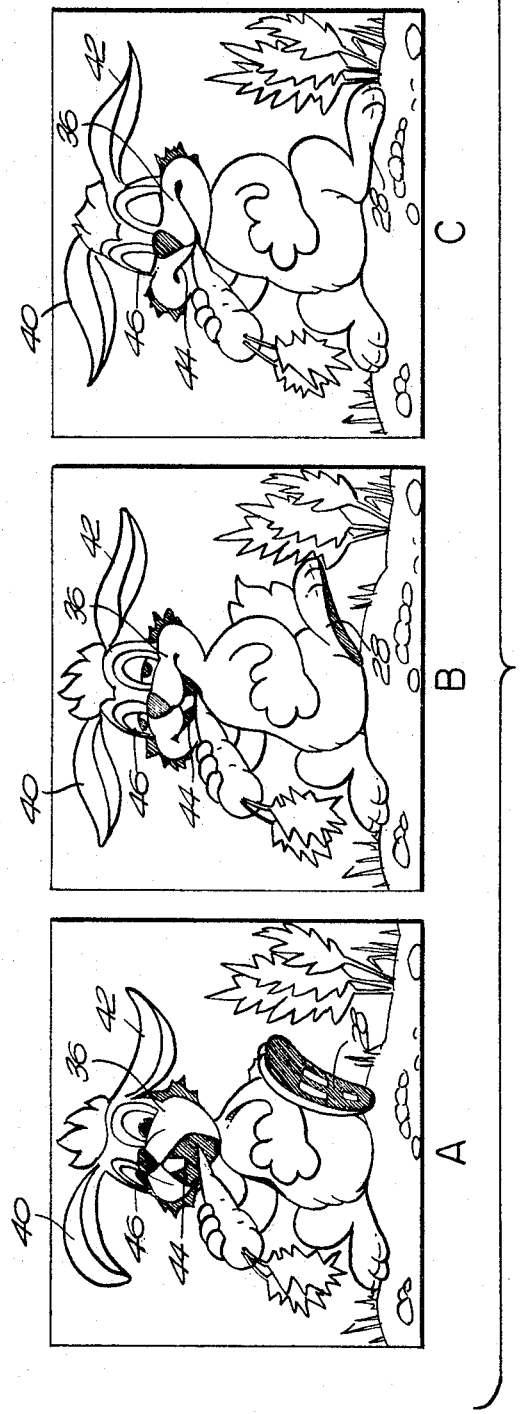
FIG. 3 is a plan view of three related master pictures which, when dissected and combined, are incorporated in the animation display portion of the embodiment of FIG. 1.

For this reason also, the animation display of the present invention is intended to provide for viewing of two or more pictures, preferably a minimum of three, which differ from one another primarily in the portions of each which represent partial changes of common subject matter from picture to picture. Thus, two pictures represent, of necessity, terminal or extreme positions of repetitive motions and the third, and any others represent respective intermediate positions. As shown in FIG. 3, all pictures are of the same subject matter shown generally as rabbit 36. In the example of the first master picture shown in FIG. 3A, the left foot 28 and right ear 40 of the rabbit are raised, the left ear 42 is lowered, and the mouth 44 and eyes 46 are at their widest. FIG. 3C is another master picture which represents the opposite extreme in which the left foot and right ear are lowered, the left ear is raised and the mouth and eyes are closed. FIG. 3B is a third master picture which shows an intermediate stage of positions of these elements of the subject matter between the two extremes.

Figure 2:
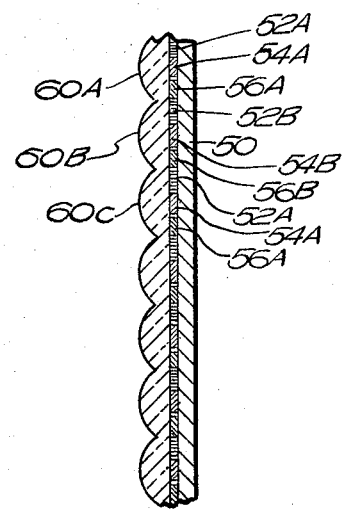
FIG. 2 is an enlarged cross-section taken along the line 2—2 of a page of the embodiment of FIG. 1.

To form animation display 26, each master picture or view of FIG. 3 is dissected into a series of parallel line elements. The respective views are then interlineated such that the line elements of each picture are parallel to and between corresponding line elements of each other picture in sequence. As shown in exaggerated thickness in FIG. 2, a master picture is formed by disposing on a suitable support sheet 50 (which for example can constitute one of pages 20) a first plurality of parallel line elements 52A, B, C, etc., corresponding to a line form dissection of the view of FIG. 3A; a second plurality of parallel line elements 54A, B, C, etc., corresponding to a dissection of FIG. 3B; and a third plurality of parallel line elements 56A, B, C, etc., corresponding to a dissection of FIG. 3C; the lines of each plurality being interleaved in sequence and in parallel between the lines of each other plurality. Each sequence of lines has disposed in parallel therewith a transparent cylindroidal lens element. Thus, for the sequence or set of lines 52A, 54A, and 56A, there is an overlying lens element 60A; for the set of lines 52B, 54B, and 56B there is a corresponding lens element 60B; etc.

When one wishes to impart the illusion of animation to display 24, the page of the book need only be viewed as it is rotated about any line element of the display as an axis. Rotation of the display through a predetermined angle will provide sequential presentation of each dissected view of FIG. 3, and a back-and-forth rotation wil convey the desired periodicity of the dynamic act referred to in the accompanying text.

Since certain changes may be made in the above product, without departing from the scope of the invention herein involved it is intended that all matter contained in the above description or shown in the accompanying drawings shall be interpreted in an illustrative and not in a limiting sense.

What is claimed is:
1. A publication comprising, in combination,
a plurality of pages affixed to one another along a common margin;
a text impressed upon at least one of said pages and including an expression of a reversible periodicity; and
a parallax panoramagram illustrative of said expression and affixed to one of said pages.
2. A publication comprising, in combination,
a plurality of pages affixed to one another along a common margin;
a text impressed upon at least one of said pages and including an expression of an act of a reversible periodicity; and
a parallax panoramagram laminated on one of said pages and comprising interlineated lineform dissections of a plurality of pictures having common subject matter, and which differ from one another primarily in the positioning of those parts of the pictures illustrative of changes occurring in the performance of said act.
3. A publication comprising, in combination,
a plurality of pages affixed to one another along a common margin;
a text impressed upon at least one of said pages and including an expression of an act of a reversible periodicity; and
a parallax panoramagram laminated on one of said pages and comprising interlineated lineform dissections of at least three pictures having common subject matter, the representations of which differ primarily in the positioning of those parts of said subject matter illustrative of changes occurring in the performance of said act.

References Cited by the Examiner

UNITED STATES PATENTS

| | | | |
|---|---|---|---|
| 1,285,753 | 11/1918 | Lowenstein | 40—137 X |
| 1,475,430 | 11/1923 | Curwen | 40—137 |
| 2,275,956 | 3/1942 | Grace | 283—63 X |
| 2,548,043 | 4/1951 | Muhlhauser | 283—63 X |
| 2,966,005 | 12/1960 | Anderson | 40—137 X |

FOREIGN PATENTS 1,206,822  8/1959  France.

LAWRENCE CHARLES, *Primary Examiner.*